(12) United States Patent
Kondo et al.

(10) Patent No.: US 7,088,536 B2
(45) Date of Patent: Aug. 8, 2006

(54) MAGNETICALLY RECORDED DATA REPRODUCTION APPARATUS AND METHOD THEREOF

(75) Inventors: Nobuhiro Kondo, Chiba (JP); Yuji Yanagi, Tokyo (JP)

(73) Assignee: Sony Corporation, Tokyo (JP)

(*) Notice: Subject to any disclaimer, the term of this patent is extended or adjusted under 35 U.S.C. 154(b) by 124 days.

(21) Appl. No.: 10/312,706

(22) PCT Filed: Apr. 12, 2002

(86) PCT No.: PCT/JP02/03673

§ 371 (c)(1),
(2), (4) Date: Jun. 12, 2003

(87) PCT Pub. No.: WO02/084648

PCT Pub. Date: Oct. 24, 2002

(65) Prior Publication Data

US 2004/0021970 A1 Feb. 5, 2004

(30) Foreign Application Priority Data

Apr. 13, 2001 (JP) .............................. 2001115590

(51) Int. Cl.
  *G11B 5/02* (2006.01)
  *G11B 5/035* (2006.01)

(52) U.S. Cl. .......................................... 360/55; 360/65

(58) Field of Classification Search ............... 360/55, 360/65, 67
See application file for complete search history.

(56) References Cited

U.S. PATENT DOCUMENTS

| 5,486,956 A | * | 1/1996 | Urata .......................... 360/65 |
| 5,550,683 A | * | 8/1996 | Koren .......................... 360/46 |
| 5,737,141 A | * | 4/1998 | Hardwick et al. ............ 360/45 |

(Continued)

FOREIGN PATENT DOCUMENTS

JP   10-97702   4/1998

(Continued)

OTHER PUBLICATIONS

Patent Abstracts of Japan for JP 6-005016, Jan. 14, 1994.*

(Continued)

*Primary Examiner*—Thang V. Tran
*Assistant Examiner*—Adam R. Giesy
(74) *Attorney, Agent, or Firm*—Frommer Lawrence & Haug LLP; William S. Frommer; Thomas F. Presson

(57) ABSTRACT

A magnetically recorded data reproduction apparatus that reproduces magnetically recorded data using a magnetoresistive head and method thereof. The recorded data are reproduced by a magnetoresistive head and supplied to a reproduction amplifier. A signal from an AGC amplifier is supplied to an A/D converter and a digital PLL circuit. A digitized signal is then supplied to, for example, a Viterbi decoder 13 and the decoded signal is obtained at an output terminal 14. Thus, the effect of noise due to the so-called thermal asperity (TA noise) is removed, thereby preventing increases in the error rate of the reproduction signals due to the effect of TA noise and the occurrence of problems in equipment.

10 Claims, 6 Drawing Sheets

U.S. PATENT DOCUMENTS

| | | | |
|---|---|---|---|
| 5,818,656 A * | 10/1998 | Klaassen et al. | 360/67 |
| 5,847,890 A * | 12/1998 | Hattori | 360/51 |
| 5,872,666 A * | 2/1999 | Saiki et al. | 360/46 |
| 6,005,726 A | 12/1999 | Tsunoda | |
| 6,038,091 A * | 3/2000 | Reed et al. | 360/46 |
| 6,101,054 A | 8/2000 | Tsunoda | |
| 6,104,331 A | 8/2000 | Ishida et al. | |
| 6,178,053 B1 | 1/2001 | Narita | |
| 6,304,397 B1 * | 10/2001 | Ozue et al. | 360/29 |
| 6,891,689 B1 * | 5/2005 | Taguchi et al. | 360/51 |

FOREIGN PATENT DOCUMENTS

| | | |
|---|---|---|
| JP | 11-3504 | 1/1999 |
| JP | 11-102503 | 4/1999 |
| JP | 11-296802 | 10/1999 |
| JP | 2001-84506 | 3/2001 |

OTHER PUBLICATIONS

International Search Report for Corresponding Application PCT/JP03/00405 mailed Nov. 11, 2003.

* cited by examiner

|  | Viterbi Decoder Off | Viterbi Decoder On |
|---|---|---|
| HPF Off | $1.0 \times 10^{-3}$ | $2.0 \times 10^{-5}$ |
| HPF (1MHz) On | $4.0 \times 10^{-3}$ | $2.0 \times 10^{-4}$ |
| Low Frequency Component Correction Prior to Integration | $1.0 \times 10^{-3}$ | $3.0 \times 10^{-6}$ |
| Low Frequency Component Correction Subsequent to Integration | $6.0 \times 10^{-4}$ | $1 \sim 5.0 \times 10^{-6}$ |

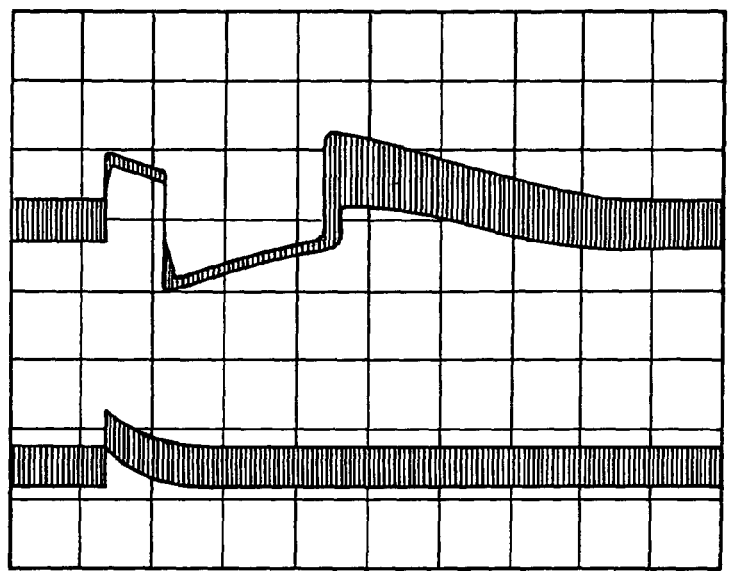
FIG. 8A Output Signal
FIG. 8B Input Signal

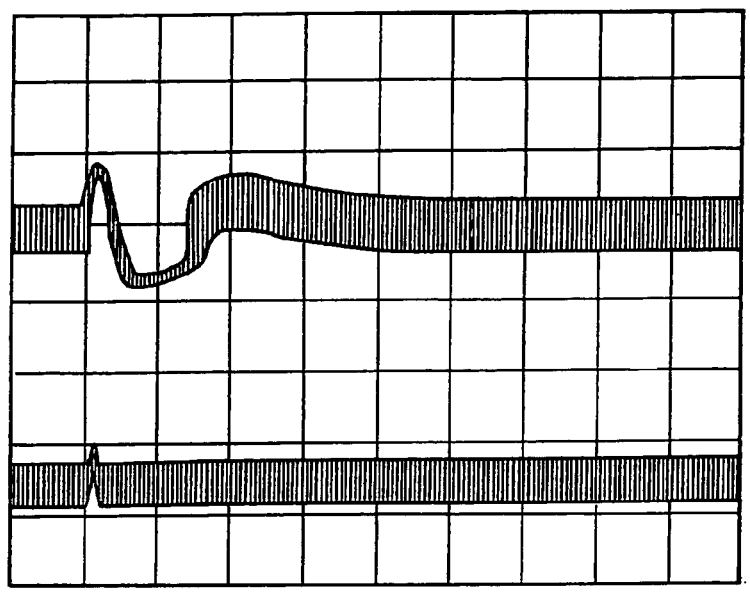
FIG. 9A
FIG. 9B
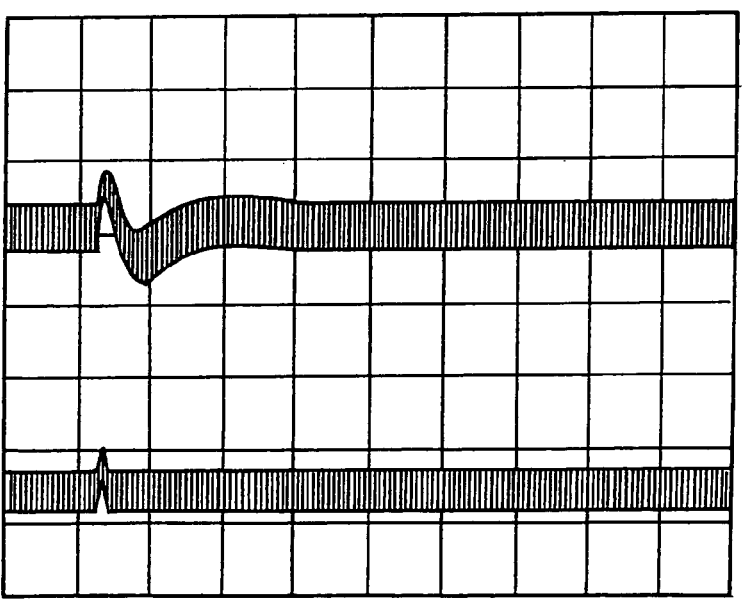
FIG. 10A
FIG. 10B

US 7,088,536 B2

MAGNETICALLY RECORDED DATA REPRODUCTION APPARATUS AND METHOD THEREOF

TECHNICAL FIELD

The present invention relates to an apparatus for reproducing magnetically recorded data using a magnetoresistive head, and a method thereof. Particularly, the present invention relates to an apparatus for reproducing magnetically recorded data and a method thereof in which the effect of thermal asperity noise specific to magnetoresistive heads is made to reduce.

BACKGROUND ART

The configuration, for example, shown in FIG. 5 has been used in an apparatus for reproducing magnetically recorded data using magneto-resistive heads.

Specifically, in FIG. 5 data recorded on, for example, magnetic tape 51 are reproduced by a magnetoresistive head (hereinafter referred to as MR head) 52. The reproduction signal is extracted to the outside of, for example, a rotating drum (not shown in the figure) through a rotary transformer 53 and then supplied to a reproduction amplifier 54.

Hereupon, a low-frequency component of the extracted signal has been cut off through the rotary transformer 53, and a low-frequency component correction circuit 55 is provided on the output side of the reproduction amplifier 54 to correct the low-frequency component cut off. The signal from the low-frequency component correction circuit 55 is supplied to an integrating equalizer 56 having characteristics approximately reverse to the characteristics of magnetic recording and reproduction. Further, the signal from the integrating equalizer 56 is supplied to a phase equalizer 57 which compensates in the magnetic recording the phase rotation due to the orientation of the medium such as tape.

Then, the signal from the phase equalizer 57 is supplied to an analog cosine equalizer 58 which is to absorb changes in frequency characteristics based on a state of the magnetic recording and reproduction system. Accordingly, through the operation of these three equalizers, the magnetic recording and reproduction system can realize almost reverse characteristics, thereby enabling a signal equivalent to that at the recording to be extracted. This signal is then extracted through an automatic gain control amplifier (hereinafter referred to as an AGC amplifier) 59 for the purpose of removing amplitude variation.

The signal from the AGC amplifier 59 is further supplied to an A/D converter 60. Also, the signal from the AGC amplifier 59 is supplied to a digital PLL circuit 61 to extract a clock signal contained in the supplied signal. Then, the extracted clock signal is supplied to the A/D converter 60 and the signal from the AGC amplifier 59 is digitized. The digitized signal is then supplied to a decoder 62 using, for example, a Viterbi algorithm (Viterbi decoder), and the decoded signal is obtained at an output terminal 63.

In this manner the reproduction of data recorded on, for example, the magnetic tape 51 is performed using the MR head 52. When, however, this type of MR head is used to reproduce data recorded on, for example, magnetic tape, a problem of the so-called thermal asperity noise (hereinafter referred to as TA noise) occurs. Namely, TA noise is a specific problem when using the MR head to reproduce recorded data.

Hereupon, the MR head is a device which detects changes in resistance values of an element due to the rotation of the magnetization angle inside the magneto resistive element caused by an external magnetic field. In this case, the external magnetic field represents a magnetic field generated by the magnetization pattern recorded on tape or a disk. Also, in the MR head this change in resistance is obtained as the change in voltage. Therefore, based on Ohm's law voltage of the output signal from the MR head is equal to the value in which a measured current is multiplied by the resistance change as expressed [$\sigma V = I \sigma R$].

However, when the MR head is collided with projecting material such as dust occurred on media, for example, tape, disk or the like, such a phenomenon occurs that resistance values suddenly (in 1 μsec. or less) change due to frictional heat generated by the collision and then slowly return (in a few μsec.) due to thermal diffusion. In other words, the resistance value of the magnetoresistive element is also changed by such heat, and fluctuations in the resistance value caused by the heat are greater than changes due to the above-mentioned external magnetic field.

When fluctuations in the resistance value due to the heat occur, changes will also occur in the voltage of output signal from the MR head in which the above described resistance change is obtained as changes in the voltage. Specifically, as shown on the left side of FIG. 6, for example, the reproduction signal held at a constant amplitude by the AGC amplifier 59 suddenly changes immediately after a collision and then slowly changes as returning. This change is called thermal asperity (TA), and noise caused by TA is called TA noise.

Moreover, experimentation verified that the above TA noise caused effects as described below. Specifically, FIG. 7 shows the configuration of an apparatus used for the experimentation, in which a signal obtained by convoluting, for example, a Lorentz 7th order M-sequence signal shown at the lower left of the figure with pseudo TA noise as shown above is used as an input signal. Such an input signal is supplied to an AGC amplifier 704 through an integrating equalizer 701, a phase equalizer 702 and a cosine equalizer 703.

In this experimental circuit, when the input signals shown in FIGS. 8B, 9B and 10B are each supplied to the integrating equalizer 701, the output signals shown in FIGS. 8A, 9A and 10A are obtained at the AGC amplifier 704, respectively. FIGS. 8A and 8B show an example in which the lower frequency component of the input signal is not cut off, and therefore in this case, TA noise of, for example, approximately 5 μsec. has a lasting effect for about 70 to 80 μsec.

Compared with this, when the lower frequency component of the input signal is cut off at, for example, 285 kHz, the effect of TA noise lasts 30 to 40 μsec. as shown in FIG. 9. Further, when the lower frequency component of the input signal is cut off at 595 kHz, the effect of TA noise lasts 10 to 20 μsec. as shown in FIG. 10. Consequently, it was verified experimentally from these results that by cutting off, for example, the lower frequency component of the input signal the length of the TA noise effect is shortened.

Through these experiments, the cause of the above-mentioned lasting TA noise effect is judged to be the fact that the dynamic range of the internal circuit is saturated with respect to an input signal having a large DC component such as TA noise, thereby generating a surge in the output signal from the AGC amplifier 704. As a result, when such a surge occurs, the error rate of the reproduction signal will increase and therefore problems such as picture freezing, audio discontinuity or others will occur in equipment such as a digital VTR.

DISCLOSURE OF THE INVENTIONS

The object of the present invention is to eliminate the effect of conceivable noise caused by the so-called thermal asperity (TA noise) and to prevent increases in the error rate of reproduction signals due to the TA noise effect, thereby preventing the occurrence of problems in equipment. According to the present invention, there is provided an apparatus for reproducing magnetically recorded data and method thereof, wherein the output signal from the magnetoresistive head is extracted through a predetermined high-pass filter and then low-frequency component correction is performed on the extracted signals.

BRIEF DESCRIPTION OF THE DRAWINGS

FIGS. 8A and 8B are figures to describe the experimental results.

FIGS. 9A and 9B are figures to describe the experimental results.

FIGS. 10A and 10B are figures to describe the experimental results.

BEST MODES FOR CARRYING OUT THE INVENTION

Figure 1:
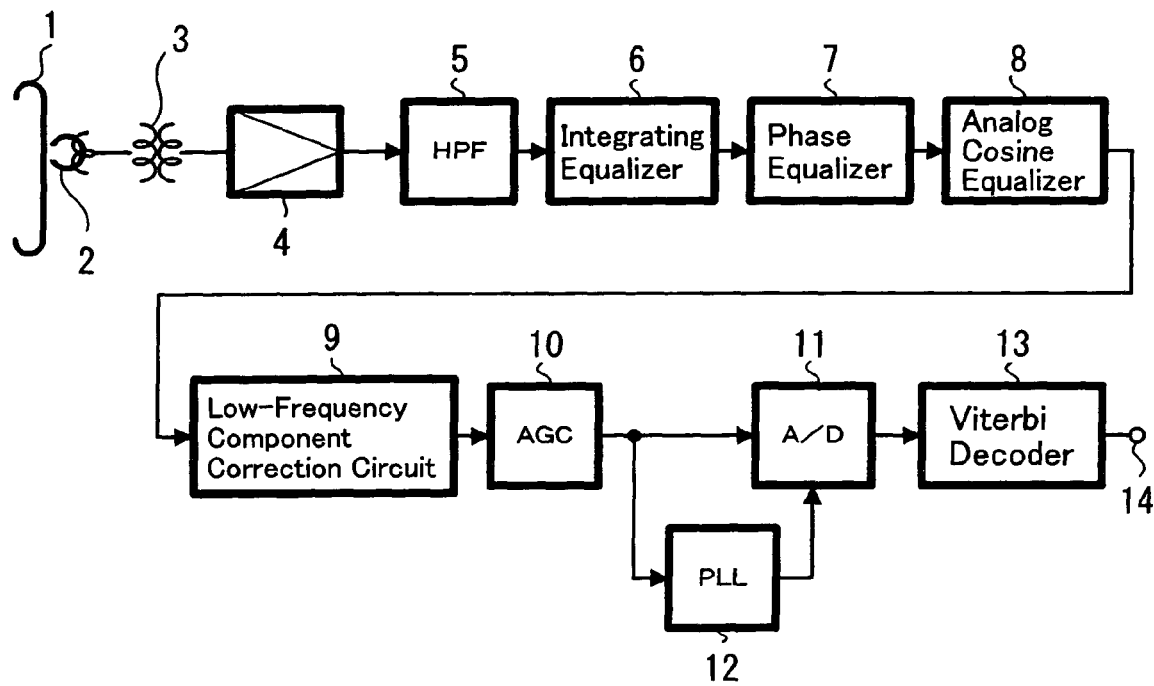
FIG. 1 is a block diagram showing the configuration of an embodiment of a magnetically recorded data reproduction apparatus to which the present invention is applied.

Referring to the figures, hereinafter the present invention is described, and FIG. 1 is a block diagram showing the configuration of an embodiment of the magnetically recorded data reproduction apparatus to which the present invention is applied.

In FIG. 1, data recorded on, for example, magnetic tape 1 are reproduced by a magnetoresistive head 2 (hereinafter referred to as MR head) and the reproduction signal is extracted to the outside of, for example, a rotating drum (not shown in the figure) through a rotary transformer 3 and then supplied to a reproduction amplifier 4. Further, the signal from the reproduction amplifier 4 is supplied to a high-pass filter 5 (hereinafter referred to as HPF) and the frequency component of, for example, 1 MHz or lower, is cut off.

Figure 2A:
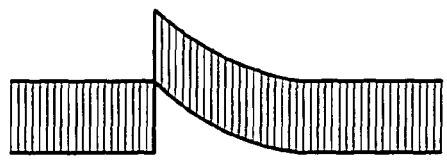
FIGS. 2A and 2B are views describing the operation of the magnetically recorded data reproduction apparatus.
Figure 2B:
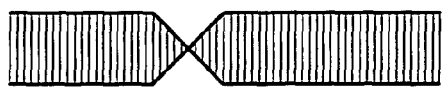

Hereupon, when noise due to, for example, thermal asperity (TA noise), has occurred, a signal with a large DC component such as shown, for example, in FIG. 2A is extracted from the reproduction amplifier 4. By supplying this signal to the above-mentioned HPF 5, the DC component is removed as shown, for example, in FIG. 2B, and excessive fluctuation of the signal is cancelled. Further, the signal from the HPF 5 is supplied to an integrating equalizer 6 having characteristics approximately reverse to the magnetic recording and reproduction characteristics.

Further, the signal from the integrating equalizer 6 is supplied to the phase equalizer 7 which compensates in the magnetic recording the phase rotation due to the orientation of the medium, such as tape. The signal from the phase equalizer 7 is then supplied to an analog cosine equalizer 8 which is provided to absorb changes in frequency characteristics based on a state of the magnetic recording and reproduction system. Consequently, through the operation of these three equalizers, the magnetic recording and reproduction system can realize approximately reverse characteristics, thereby enabling a signal equivalent to that at the recording to be extracted.

In this case, the large DC component due to, for example, TA noise has been removed from the extracted signal. Thereupon, if this signal is directly supplied to the automatic gain control amplifier (hereinafter referred to as AGC amplifier), a zero-crossing point of the lower frequency component will be changed due to the cutoff of the lower signal, whereby malfunction of, for example, the subsequent PLL means may occur. To avoid this problem, a low-frequency component correction circuit 9 is provided at a stage prior to the AGC amplifier.

In other words, the signal from the analog cosine equalizer 8 is supplied to the low-frequency component correction circuit 9 and then the signal from the low-frequency component correction circuit 9 is supplied to an AGC amplifier 10. Thereafter, the signal from the AGC amplifier 10 is supplied to an A/D converter 11. The signal from the AGC amplifier 10 is also supplied to a digital PLL circuit 12 and then a clock signal contained in the signal is extracted. The extracted clock signal is then supplied to the A/D converter 11 and the signal from the AGC amplifier 10 is digitized.

Further, the digitized signal is supplied to a decoder 13 which uses, for example, Viterbi algorithm (Viterbi decoder) to extract the decoded signal at an output terminal 14. In this manner, using the MR head 2 the reproduction of data recorded on, for example, the magnetic tape 1 is performed. In this case, according to the above-described apparatus the large DC component due to TA noise is removed by the HPF 5 and the effect of the TA noise is prevented.

Thus, in this embodiment the output signal from the magnetoresistive head is extracted through a predetermined high-pass filter and then a low-frequency component correction is performed on the extracted signal, whereby even if noise due to the so-called thermal asperity (TA noise) occurs, its effect can be eliminated. Consequently, in this embodiment the error rate of the reproduction signal due to the effect of the TA noise is prevented from increasing and the occurrence of problems in equipment is thus prevented.

Although in a conventional apparatus the problem of noise due to the so-called thermal asperity (TA noise) occurs when reproducing magnetically recorded data using a magnetoresistive head, and therefore the error rate of the reproduction signal increases and problems such as picture freezing and audio discontinuity occur in equipment such as a digital VTR or the like, these problems can be solved without difficulties according to the present invention.

Figure 3A:
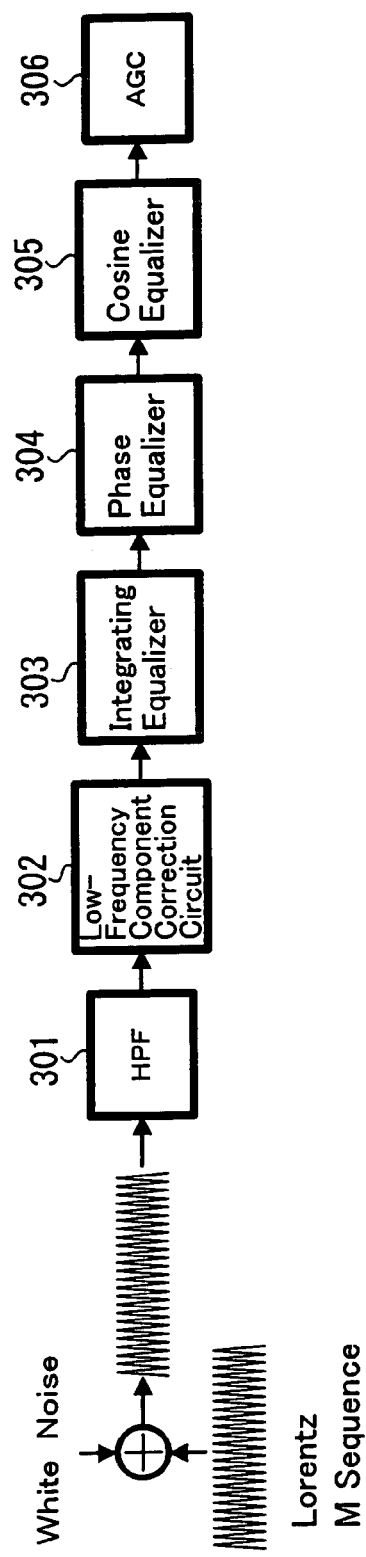
FIGS. 3A and 3B are block diagrams showing the configuration of experimental circuits to describe the operation of the magnetically recorded data reproduction apparatus.
Figure 3B:
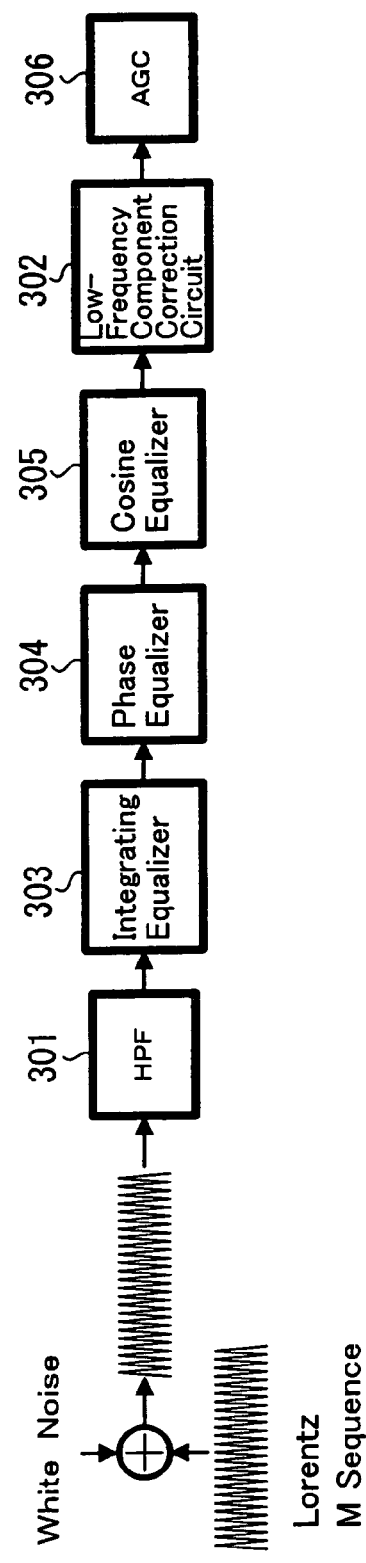
Figures 4, 5:
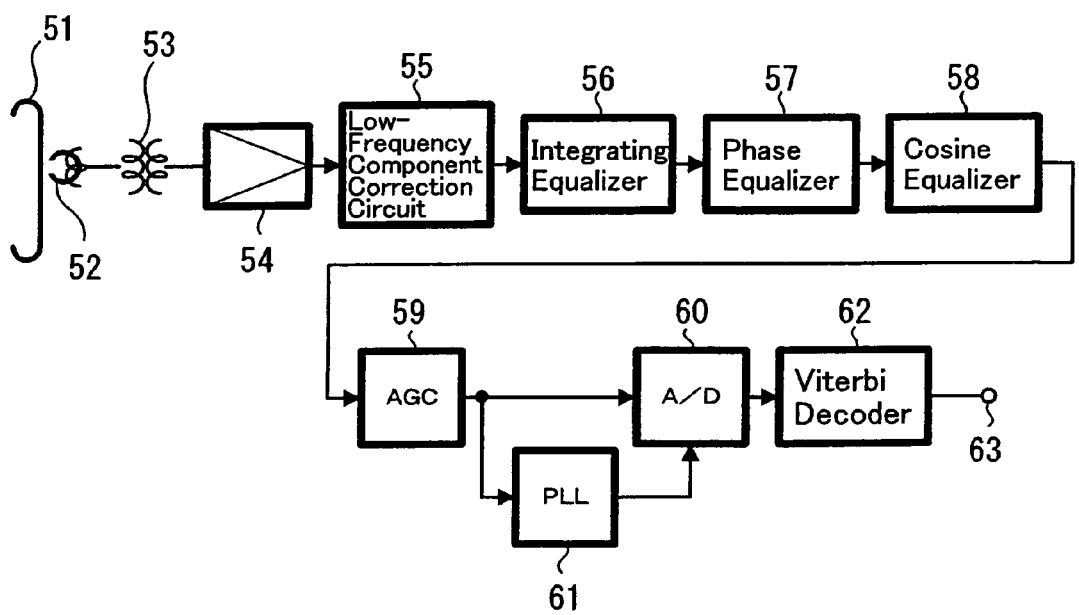
FIG. 4 is a table describing the experimental results.
FIG. 5 is a block diagram showing the configuration of a conventional magnetically recorded data reproduction apparatus.
Figure 6:
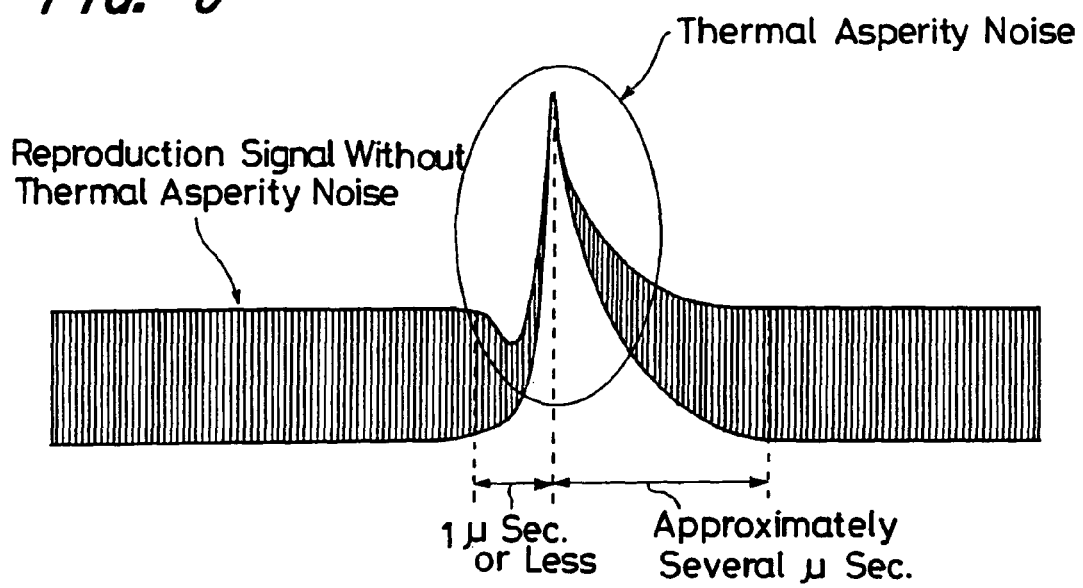
FIG. 6 is a figure describing noise due to thermal asperity (TA noise).
Figure 7:
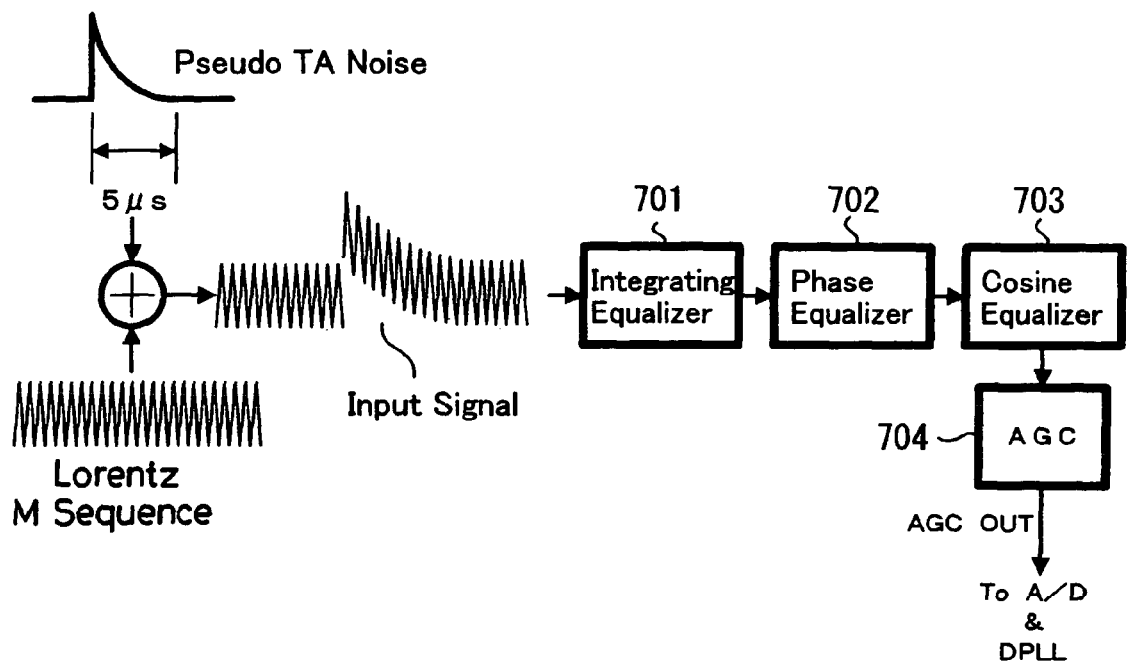
FIG. 7 is a block diagram showing the experimental circuit to describe the operation of the magnetically recorded data reproduction apparatus.

Further, in FIGS. 3A, 3B and 4 there are shown the results of the experiments performed in order to confirm the effectiveness of the present invention. At first, FIGS. 3A and 3B show the configuration of the apparatus used in the experiment, in which as shown at the lower left of the figure a signal obtained by convoluting, for example, a Lorentz 7th order M-sequence signal with white noise is used as an input signal. In the configuration of FIG. 3A, the input signal is supplied to an AGC amplifier 306 through a HPF 301, a low-frequency component correction circuit 302, an integrating equalizer 303, a phase equalizer 304 and a cosine equalizer 305.

In contrast, in the configuration of FIG. 3B the abovementioned input signal is supplied to the AGC amplifier 306 through each of the following circuits in order; the HPF 301, the integrating equalizer 303, the phase equalizer 304, the cosine equalizer 305 and the low-frequency component correction circuit 302. Specifically, in the configuration of FIG. 3A, the low-frequency component correction circuit 302 is provided at a stage prior to the integrating equalizer 303 and in the configuration of FIG. 3B, the low-frequency component correction circuit 302 is provided at a stage subsequent to the integrating equalizer 303.

Then, the error rate in each of these experimental circuits was measured when a Viterbi decoder was used; and when a Viterbi decoder was not used. As shown in the table of FIG. 4, when both the HPF and Viterbi decoder were not used, the error rate was $1.0 \times 10^{-3}$, and when the HPF was OFF and the Viterbi decoder was ON, the error rate was $2.0 \times 10^{-5}$. However, for example, when only the HPF was ON, the error rate became $4.0 \times 10^{-3}$ with the Viterbi decoder being OFF and the error rate became $2.0 \times 10^{-4}$ with the Viterbi decoder being ON and the rate worsened.

However, in the configuration in which the low-frequency component correction circuit 302 was provided at a stage prior to the integrating equalizer 303, the error rate was $1.0 \times 10^{-3}$ when the Viterbi decoder was OFF and $3.0 \times 10^{-6}$ when the Viterbi decoder was ON. Further, in the configuration in which the low-frequency component correction circuit 302 was provided at a stage subsequent to the integrating equalizer 303, the error rate was $6.0 \times 10^{-4}$ when the Viterbi decoder was OFF and $1 \sim 5.0 \times 10^{-6}$ when the Viterbi decoder was ON. Each of the above error rates became equal or improved to that without the HPF being used.

According to the above-described magnetically recorded data reproduction apparatus, the magnetically recorded data reproduction apparatus is an apparatus for reproducing magnetically recorded data using a magnetoresistive head, in which the output signal from the magnetoresistive head is extracted through a predetermined high-pass filter and then a low-frequency component correction is performed on the extracted signal, and after that, the signal is supplied to the A/D converter for extracting magnetically recorded data and the digital PLL means for A/D conversion, thereby removing the effect caused by the occurrence of TA noise.

Consequently, possibilities of the problems such as picture freezing and audio discontinuity caused by the increase in the error rate of the reproduction signal will be eliminated in equipment such as a digital VTR or the like. Further, in order to avoid occurrence of TA noise, cost increase has been conventionally inevitable as specifications for the head and tape were made to be strict. However, according to the present invention these strict specifications can be alleviated and costs will be reduced.

Further, the present invention is not limited to the embodiments described above but can be modified without deviating from the scope thereof.

In other words, according to the present invention, the effect of noise due to the so-called thermal asperity (TA noise) can be eliminated by extracting the output signal from the magnetoresistive head through a predetermined high-pass filter and then performing a low-frequency component correction on the extracted signal. As a result, the increase of the error rate with respect to the reproduction signal caused by the effect of the TA noise is prevented and also the occurrence of problems in the equipment is avoidable.

Further, according to the present invention, since a high-pass filter has a cutoff frequency of approximately 1 MHz, the effect of the noise can effectively removed even if noise due to thermal asperity (TA noise) occurs.

Furthermore, according to the present invention, since the low-frequency component correction means is provided at a stage subsequent to the integrating equalizer to which the signal extracted through the abovementioned high-pass filter is supplied, the effect of the noise due to thermal asperity (TA noise) can be effectively removed and the error rate can be improved.

Even further, since a magnetoresistive head is mounted on a rotating drum, the present invention can also be applied to a rotating head type recording and reproduction apparatus.

Even further, since a magnetoresistive head reproduces signals recorded on the magnetic tape, the present invention can also be applied to a rotating head type recording and reproduction apparatus.

Thus, in a conventional apparatus there has been possibility of occurrence of noise due to the so-called thermal asperity (TA noise) when reproducing magnetically recorded data using a magnetoresistive head, and because of that, the error rate of the reproduction signal increases in equipment such as a digital VTR or the like, whereby picture freezing and audio discontinuity may occur. However, those problems can be easily solved according to the present invention.

Furthermore, in order to avoid occurrence of TA noise, specifications for the head and tape were conventionally made to be strict and costs increased inevitably. According to the present invention, these strict specifications can be alleviated and costs will be reduced.

What is claimed is:

1. A data reproduction apparatus which reproduces magnetically recorded data using a magnetoresistive head comprising:

a high-pass filter adapted to receive an input signal and to extract an output signal from said magnetoresistive head;

wherein the input signal has a thermal asperity noise portion with a leading edge duration of approximately one microsecond and a falling edge duration of approximately between 1 microsecond and 4 microseconds;

a plurality of equalizers for receivinig the output signal and enabling a signal equivalent to that of the recorded data to be reproduced:

a low-frequency component correction circuit for performing low-frequency component correction on the signal outputted from the plurality of equalizers;

an automatic gain control (AGC) amplifier for receiving the corrected extracted signal and processing the corrected extracted signal;

a phase lock loop means for receiving the corrected extracted signal from the AGC amplifier and extracting a clock signal from the corrected extracted signal; and an analog-to-digital (A/D) converter for receiving the corrected extracted signal from the AGC amplifier and for receiving the clock signal from the phase lock loop means and for producing a digital signal.

2. The data reproduction apparatus according to claim 1, wherein said high-pass filter has a cutoff frequency of approximately 1 MHz.

3. The data reproduction apparatus according to claim 1, further comprising:

an integrating equalizer that receives the extracted signal from said high-pass filter and processes the extracted signal; and wherein the low-frequency component correction circuit performs said low-frequency component correction subsequent to the integrating equalizer processing.

4. The data reproduction apparatus according to claim 1, wherein said magnetoresistive head is mounted on a rotating drum.

5. The data reproduction apparatus according to claim 1, wherein said magnetoresistive head reproduces signals recorded on magnetic tape.

6. A method for reproducing magnetically recorded data using a magnetoresistive head comprising:

extracting an output signal received from an input signal from said magnetoresistive head through a high-pass filter;

wherein the input signal has a thermal asperity noise portion with a leading edge duration of approximately one microsecond and a falling edge duration of approximately between 1 microsecond and 4 microseconds;

a plurality of equalizers for receiving the output signal and enabling a signal equivalent to that of the recorded data to be reproduced;

performing low-frequency component correction on the signal outputted from the plurality of equalizers;

extracting a clock signal from the corrected extracted signal; and producing a digital signal from the corrected extracted signal and the clock signal.

7. The method according to claim 6, wherein said high-pass filter has a cutoff frequency of approximately 1 MHz.

8. The method according to claim 6, wherein the step of performing said low-frequency component correction is performed subsequent to an integrating equalizing step.

9. The method according to claim 6, wherein said magnetoresistive head is mounted on a rotating drum.

10. The method according to claim 6, wherein said magnetoresistive head reproduces signals recorded on magnetic tape.

* * * * *